UNITED STATES PATENT OFFICE.

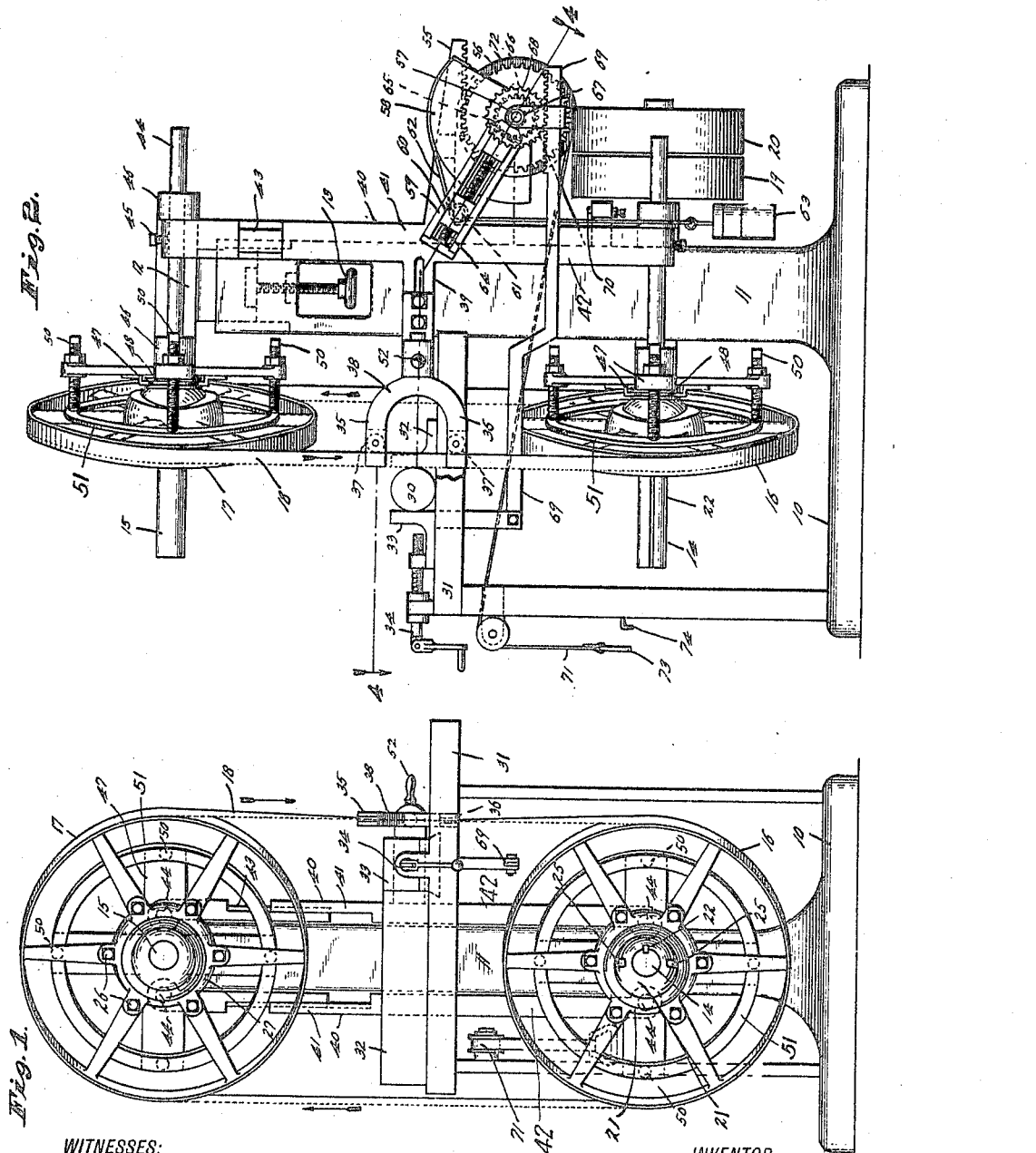

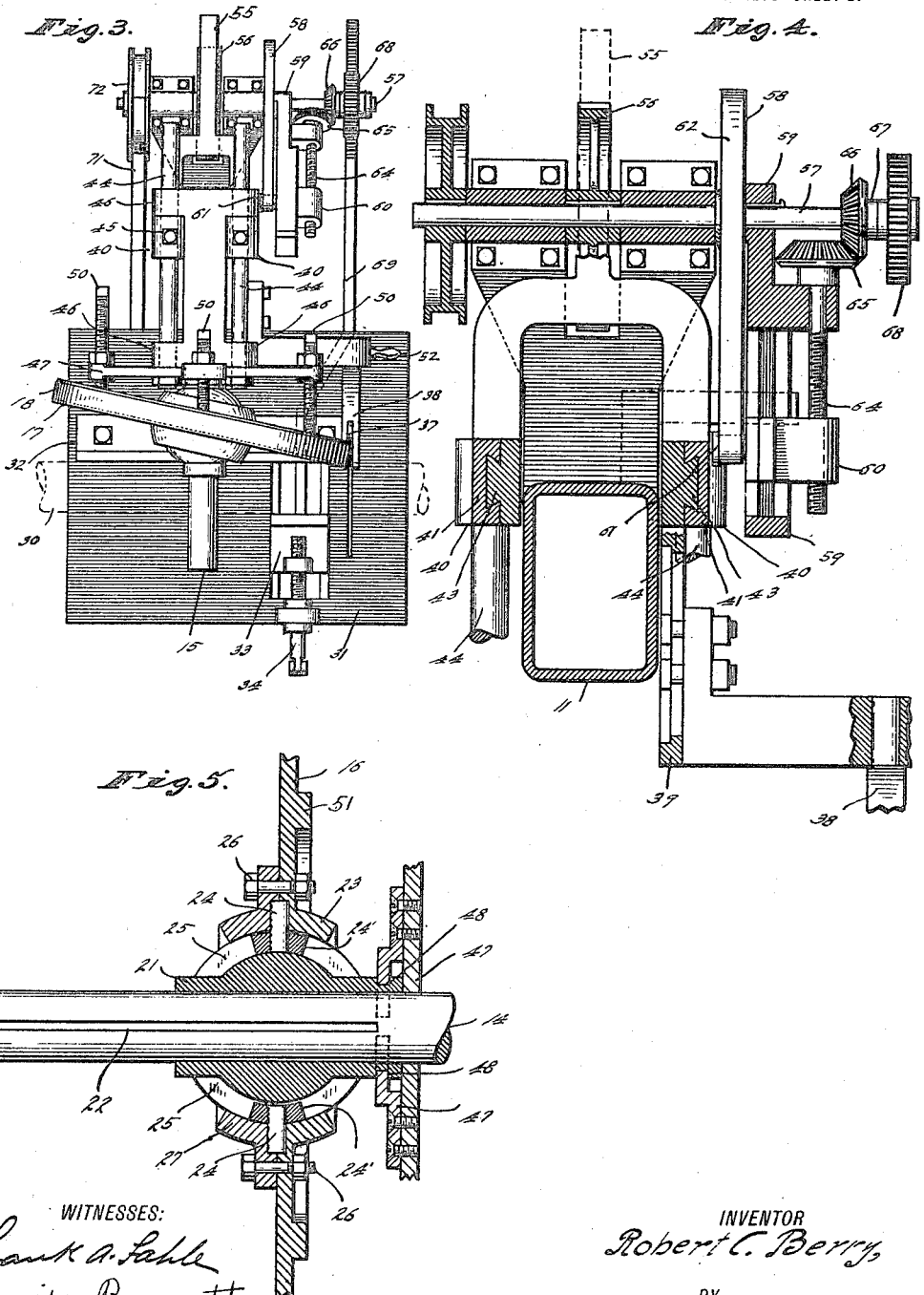

ROBERT C. BERRY, OF INDIANAPOLIS, INDIANA.

BAND-SAW.

1,152,696.  Specification of Letters Patent.  Patented Sept. 7, 1915.

Application filed August 3, 1914. Serial No. 854,625.

*To all whom it may concern:*

Be it known that I, ROBERT C. BERRY, a citizen of the United States, residing at Indianapolis, in the county of Marion and State of Indiana, have invented a new and useful Band-Saw, of which the following is a specification.

My invention relates to band saws, especially for sawing metal. Its object is to provide a construction whereby the work remains stationary and the saw band travels; the idle side of the saw band does not interfere with the work, even though long pieces are being sawed; the feeding of the saw to the work is automatic, with either a uniform feed pressure or a varying feed pressure as desired; and the varying feed pressure, mainly used for sawing round pieces, first increases and then decreases automatically, corresponding with the changing length of saw cut in the work, and is controlled by the size of the piece being sawed so that it also varies with the diameter of such piece.

The accompanying drawings illustrate my invention.

Figure 1 is a front elevation of a metal band saw embodying my invention; Fig. 2 is a side elevation thereof; Fig. 3 is a plan thereof; Fig. 4 is a partial section on the line 4—4 of Fig. 2; and Fig. 5 is an axial section through the mounting of the lower band wheel.

The supporting base 10 carries an upright 11, conveniently integral with the base, and in the upper end of the upright is a slide 12, vertically adjustable by a hand wheel 13. Lower and upper horizontal shafts 14 and 15 are suitably supported in the upright 11 and the slide 12 respectively; and these two shafts, which are conveniently in the same vertical plane, support lower and upper band wheels 16 and 17, over which the saw band 18 travels in the direction indicated by the arrows. The hand wheel 13 provides for adjusting the tension of this saw band. At least one of the shafts, conveniently the lower one 14, is journaled in its support, and this shaft is provided with suitable driving means, such as fast and loose pulleys 19 and 20, the band wheel 16 carried by this shaft being suitably mounted so that it is driven thereby. In one form of this mounting, shown in Fig. 5, a sleeve 21 is splined at 22 on the shaft 14 so as to rotate therewith while being axially slidable therealong, and this sleeve is spherical exteriorly and provides a support for the band wheel 16, the interior of the hub 23 of which is a segment of a sphere fitting on the sleeve 21, the band wheel being compelled to rotate with the sleeve by reason of two diametrically opposite pins 24 which project inward from the hub 23 into two grooves 25 in the surface of the sleeve 21, these grooves 25 being opposite each other and co-planar with the axis of the shaft 14. The pins 24 may fit rotatably in slide blocks 24′ sliding in the grooves 25. For assembling purposes, the hub 23 is made in two parts fastened together by bolts 26, one part being integral with the band wheel 16 proper and the other being a cap piece 27. By reason of this mounting, the band wheel 16 is driven by the shaft 14, but is slidable axially of such shaft and may rotate about an axis at an angle to the axis of such shaft, for reasons hereinafter apparent.

The mounting for the band wheel 17 is similar to that of the band wheel 16; save that the spline 22, pins 24, and grooves 25 may be omitted, especially if the shaft 15 is not mounted for rotation.

The piece to be sawed, shown as a piece of round metal 30, is supported on a stationary table 31, usually horizontal, and is held stationary between stationary and movable vise jaws 32 and 33, the latter being adjustable by a hand screw 34. The piece of metal to be sawed, and consequently the vise jaws, are perpendicular to the plane of the shafts 14 and 15 when the piece is to be sawed off square, and that part of the saw band which at any time is operated on the metal is held in a plane parallel to such shafts by slotted guide fingers 35 and 36 above and below the piece of metal being sawed, these guide fingers having rollers 37 at the bottoms of their slots for pressing against the back edge of the saw band and being parts of a yoke 38 adjustably mounted on the forwardly projecting arm 39 of a feed frame 40 which is slidable forwardly and rearwardly to feed the saw to cut off the piece of metal. The feed frame is slidably supported on the upright 11, and in addition to its central forwardly extending arm 39 also has upwardly and downwardly extending arms 41 and 42, the arm 41 carrying a vertically movable slide 43 in its upper end for permitting adjustment corresponding to that of the upright 11 and its slide 12.

The arm 42 and the slide 43 of the feed frame are each drilled to receive a pair of rods 44, which extend forward parallel to the shafts 14 and 15 and may be clamped by screws 45 in any desired position on such arm and slide. These rods 44 fit slidingly in perforated guide lugs 46 on the upright 11 and the slide 12, and their forward ends are fixed to plates 47, of which there is one for each of the band wheels. Each of these plates is attached to the sleeve 21 of the adjacent band wheel 16 or 17 so as to allow such sleeve to rotate freely independently of the plates while preventing it from having axial movement save with such plate, this attachment conveniently being by a circumferential groove 48 in one end of the sleeve 21 into which groove extends the plate 47 or a part mounted thereon. Each plate 47 carries a plurality of screws 50, adjustable in and extending transversely of their respective plates, and the rounded ends of the screws 50 on each plate bear against a lateral face of a ring 51 with which each band wheel 16 and 17 is provided. By adjusting the screws 50, the plane of the band wheels 16 and 17 and saw band 18 may be adjusted to any desired angle, right or oblique, to the plane of the shafts 14 and 15, so that the upward-running side of the saw band may be made to take any desired position relative to the downward-running side and by setting for an oblique angle long pieces may be sawed without being interfered with by such upward-running side. The guide fingers 35 and 36 skew the working part of the downward-running side of the saw so that it is parallel to the shafts 14 and 15. Thus by moving the feed frame 40 forward and backward the saw and its supporting band wheels are also moved forward and backward, such movement always being parallel to the shafts 14 and 15.

While the movement of the feed frame may be obtained entirely by hand, as by a handle 52 on such feed frame, I prefer to make the forward or cutting movement thereof an automatic one. To this end the feed frame is provided with a rearwardly extending arm 55, which on its under side has rack teeth which mesh with a gear 56 fast on a longitudinal shaft 57 suitably supported on the rear of the upright 11. Also fastened on the shaft 57 are a disk sector 58 and an arm 59, the latter being provided with a slide 60 movable longitudinally of the arm and carrying a removable pin 61 which projects into the plane of the disk sector 58. A strap 62 is fastened at one end to the disk sector 58 and at the other is provided with a weight 63 of adjustable size. The intermediate part of the strap 62 may lie along the periphery of the sector 58, or may pass over the pin 61, as desired. The slide 60 is adjustable along the arm 59 by having a threaded engagement with a screw 64 extending along such arm and provided at its inner end with a bevel gear 65 which meshes with a bevel gear 66 fixed on a sleeve 67 loose on the shaft 57. The sleeve 67 also has fixed thereon a gear 68, which meshes with a rack 69 suitably connected to the movable vise jaw 33 so as to be moved thereby. Thus a movement of the vise jaw 33 produces a movement of the slide 60 and pin 61 along the arm 59 to vary the distance of the pin from the shaft 57 in the same sense as the distance between the two vise jaws varies. The weight 63 tends to move the feed frame forward, and with it the band wheels and saw. When the strap 62 is only on the sector 58, the pressure of the saw on the work is substantially uniform throughout the cut, being variable in amount by adjusting the size of the weight 63; this is the ordinary arrangement when square or otherwise rectangular pieces of metal are being sawed. When the strap 62 extends over the pin 61, however, the effective lever arm of the weight varies with the movement of the shaft 57, so that the force of the saw on the work increases as the arm 59 approaches the horizontal and decreases as it continues its movement below the horizontal, the arm becoming horizontal at substantially the middle of the cut (though the drawings may not be mathematically accurate in this respect); this arrangement is ordinarily used when round pieces are being sawed. Moreover, with this latter arrangement the effective lever arm of the weight 63 is also varied by the movement of the movable vise jaw 33 to receive different sizes of work, for the distance of the pin 61 from the shaft 57 varies in the same sense as the diameter of the work clamped between the vise jaws; and by properly proportioning the various parts used in connecting the movable vise jaw 33 and the slide 60 the angular swing of the arm 59 may be maintained the same for all lengths of cuts, the pressure of the saw on the work varying both in the same sense as the size of the work and in inverse sense as the distance of the saw from the center of the cut. The forward or cutting movement of the saw may be stopped in any suitable manner after the cut is completed, as by an adjustable stop screw 70 carried by the upright 11 in the path of the arm 59. After a cut is completed, the saw, band wheels, and feed frame are returned to normal position by any suitable returning means; as shown, there is a strap 71 fastened to and extending around a disk 72 fixed on the shaft 57, this strap extending to the front of the machine and there being provided with a handle 73 upon which the operator may pull to move the saw backward. A hook 74 may be provided to receive the handle 73 to hold the saw in its rearward position if desired.

I claim as my invention:

1. A band saw, comprising the combination of two band wheels for receiving the saw band and having their axes substantially parallel, a driving shaft carrying one of such band wheels and having its axis at an angle to the axis of such band wheel, guides for skewing the cutting part of the saw band so that it is in a plane parallel to such shaft axis, and means for moving the band wheels parallel to such shaft axis.

2. A band saw, comprising the combination of two band wheels for receiving the saw band and having their axes substantially parallel, a driving shaft carrying one of such band wheels and having its axis at an angle to the axis of such band wheel, and means for moving the band wheels parallel to such shaft axis.

3. A band saw, comprising the combination of two band wheels for receiving the saw band and having their axes substantially parallel, a driving shaft carrying one of such band wheels and having its axis at an angle to the axis of such band wheel, and guides for skewing the cutting part of the saw band so that it is in a plane parallel to such shaft axis.

4. A band saw, comprising the combination of two band wheels for receiving the saw band and having their axes substantially parallel, and a driving shaft carrying one of such band wheels and having its axis at an angle to the axis of such band wheel.

5. A band saw, comprising the combination of two band wheels for receiving the saw band, means for holding stationary the work to be sawed, means for supporting said band wheels so that they can be moved parallel to the line of sawing, means for transmitting power to one of said band wheels, and means for varying the angle between the axes of the band wheels and the line of such movement and still maintaining the operative connection between one of such band wheels and the same power-transmitting means.

6. A band saw, comprising the combination of two band wheels for receiving the saw band, means for holding stationary the work to be sawed, means for supporting said band wheels so that they can be moved parallel to the line of sawing, and automatic means for moving such band wheels to feed the saw into the piece being sawed with a force which varies during the sawing stroke.

7. A band saw, comprising the combination of means for holding stationary the work to be sawed, two band wheels for receiving and supporting a saw band so that the latter can be moved parallel to the desired line of sawing, and automatic means for feeding the cutting portion of the saw band along the line of cutting with a force which varies at different points along such line.

8. A band saw, comprising the combination of relatively movable vise jaws for holding stationary the work to be sawed, two band wheels for receiving and supporting a saw band so that the latter can be moved parallel to the desired line of sawing, means for automatically feeding the cutting portion of said saw along such line into the piece being sawed, and means controlled by the distance between the vise jaws for varying the force with which the saw is so fed.

9. A band saw, comprising the combination of relatively movable vise jaws for holding stationary the work to be sawed, two band wheels for receiving and supporting a saw band so that the latter can be moved parallel to the desired line of sawing, means for feeding the cutting portion of said saw along such line into the piece being sawed with a force which varies at different points along such line, and means controlled by the distance between the vise jaws for varying such force.

10. A band saw, comprising the combination of means for holding stationary the work to be sawed, two band wheels for receiving and supporting a saw band so that the latter can be moved parallel to the desired line of sawing, a rotatable member operating on said saw for feeding its cutting portion along such line into the piece being sawed, and a weight connected to said rotatable member and tending to rotate it to produce such feeding, said rotatable member having a pin from which said weight hangs so that the effective leverage of the weight varies during the saw-feeding movement.

11. A band saw, comprising the combination of means for holding stationary the work to be sawed, two band wheels for receiving and supporting a saw band so that the latter can be moved parallel to the desired line of sawing, a rotatable member operating on said saw for feeding its cutting portion along such line into the piece being sawed, a weight connected to said rotatable member and tending to rotate it to produce such feeding, said rotatable member having a pin from which said weight hangs so that the effective leverage of the weight varies during the saw-feeding movement, and means for varying the distance of said pin from the axis of said rotatable member.

12. A band saw, comprising the combination of relatively movable vise jaws for holding stationary the work to be sawed, two band wheels for receiving and supporting a saw band so that the latter can be moved parallel to the desired line of sawing, a rotatable member operating on said saw for feeding its cutting portion along such line into the piece being sawed, a weight connected to said rotatable member and tending to rotate it to produce such feeding, said rotatable member having a pin from which said weight hangs so that the effective leverage of the weight varies during the saw-feeding movement, and means controlled by the distance between said vise jaws for varying the distance of said pin from the axis of said rotatable member.

13. A band saw, comprising the combination of relatively movable vise jaws for holding stationary the work to be sawed, two band wheels for receiving and supporting a saw band so that the latter can be moved parallel to the desired line of sawing, a rotatable member operating on said saw for feeding its cutting portion along such line into the piece being sawed, a weight connected to said rotatable member and tending to rotate it to produce such feeding, and means controlled by the distance between said vise jaws for varying the length of the lever arm by which said weight acts on said rotatable member.

14. A band saw, comprising the combination of means for holding stationary the work to be sawed, two band wheels for receiving and supporting a saw band so that the latter can be moved parallel to the desired line of sawing, a rotatable member operating on said saw for feeding its cutting portion along such line into the piece being sawed, a weight connected to said rotatable member and tending to rotate it to produce such feeding, and means for varying the length of the lever arm by which said weight acts on said rotatable member.

15. A band saw, comprising means for supporting the work to be sawed, two band wheels for receiving and supporting the saw band, means for varying the angle between the axes of such band wheels and the line of sawing, and a driving shaft carrying one of such wheels and having its axis at a fixed angle to the line of sawing.

16. A band saw, comprising means for supporting the work to be sawed, two band wheels for receiving and supporting the saw band, means for transmitting power to one of said band wheels, and means for varying the angle between the axes of such band wheels and the line of sawing and still maintaining the operative connection between one of such band wheels and the same power-transmitting means.

17. A band saw, comprising means for supporting the work to be sawed, two band wheels for receiving and supporting the saw band, means for varying the angle between the axes of such band wheels and the line of sawing, a driving shaft carrying one of such wheels and having its axis at a fixed angle to the line of sawing, and means for maintaining the cutting portion of the saw in the plane of the line of sawing.

18. A band saw, comprising a supporting frame, a shaft mounted for rotation therein and provided with means for receiving power, a sleeve splined on such shaft, a band wheel mounted on said sleeve so as to rotate therewith when the shaft is rotated but so that it can do so about an axis at an angle to that of the shaft, a member slidable relatively to said frame in a direction parallel to said shaft, a second band wheel mounted on said sliding member so that when rotated it may do so about an axis at an angle to that of the shaft, means for varying the angle between the axes of said band wheels and the axis of the shaft, a band saw carried by said two band wheels, and means for moving said sleeve and said sliding member and the band wheels carried thereby relatively to the frame in a direction parallel to said shaft.

19. A band saw, comprising a supporting frame, a shaft mounted for rotation therein and provided with means for receiving power, a sleeve splined on such shaft, a band wheel mounted on said sleeve so as to rotate therewith when the shaft is rotated but so that it can do so about an axis at an angle to that of the shaft, a member slidable relatively to said frame in a direction parallel to said shaft, a second band wheel mounted on said sliding member so that when rotated it may do so about an axis at an angle to that of the shaft, a band saw carried by said two band wheels, and means for moving said sleeve and said sliding member and the band wheels carried thereby relatively to the frame in a direction parallel to said shaft.

20. A band saw, comprising a supporting frame, a shaft mounted for rotation therein and provided with means for receiving power, a sleeve splined on such shaft, a band wheel mounted on said sleeve so as to rotate therewith when the shaft is rotated but so that it can do so about an axis at an angle to that of the shaft, a member slidable relatively to said frame in a direction parallel to said shaft, a second band wheel mounted on said sliding member so that when rotated it may do so about an axis at an angle to that of the shaft, means for varying the angle between the axis of said band wheels and the axis of the shaft, and a band saw carried by said two band wheels.

21. A band saw, comprising a supporting frame, a shaft mounted for rotation therein and provided with means for receiving power, a sleeve splined on such shaft, a band wheel mounted on said sleeve so as to rotate therewith when the shaft is rotated but so that it can do so about an axis at an angle to that of the shaft, a member slidable relatively to said frame in a direction parallel to said shaft, a second band wheel mounted on said sliding member so that when rotated it may do so about an axis at an angle to that of the shaft, and a band saw carried by said two band wheels.

22. A band saw, comprising a supporting frame, a shaft mounted for rotation therein and provided with means for receiving power, a sleeve splined on such shaft, a band wheel mounted on said sleeve so as to rotate therewith when the shaft is rotated but so that it can do so about an axis at an angle to that of the shaft, a member slidable relatively to said frame in a direction parallel to said shaft, a second band wheel mounted on said sliding member so that when rotated it may do so about an axis at an angle to that of the shaft, a band saw carried by said two band wheels, means for holding stationary the work to be sawed, and means for automatically moving said sleeve and said sliding member and the band wheels carried thereby relatively to the frame and the work to be sawed in a direction parallel to said shaft with a force which varies at different points in the movement.

23. A band saw, comprising a supporting frame, a shaft mounted for rotation therein and provided with means for receiving power, a sleeve splined on such shaft, a band wheel mounted on said sleeve so as to rotate therewith when the shaft is rotated but so that it can do so about an axis at an angle to that of the shaft, a member slidable relatively to said frame in a direction parallel to said shaft, a second band wheel mounted on said sliding member so that when rotated it may do so about an axis at an angle to that of the shaft, a band saw carried by said two band wheels, means for holding stationary the work to be sawed, and means for automatically moving said sleeve and said sliding member and the band wheels carried thereby relatively to the frame and the work to be sawed in a direction parallel to said shaft with a force which is controlled by the position of said work-holding means.

In witness whereof, I have hereunto set my hand at Indianapolis, Indiana, this 31st day of July, A. D. one thousand nine hundred and fourteen.

ROBERT C. BERRY.

Witnesses:
 G. B. SCHLEY,
 FRANK A. FAHLE.